March 3, 1964    J. A. MARLAND    3,123,193
TORQUE CONTROL DEVICE
Filed April 21, 1960    3 Sheets-Sheet 1

Inventors
Joseph A. Marland
By:
Graf, Nierman & Burmeister
Attorneys

March 3, 1964

J. A. MARLAND 3,123,193

TORQUE CONTROL DEVICE

Filed April 21, 1960

Inventor
Joseph A. Marland
By:
Graf, Nierman & Burmeister
Attorneys

March 3, 1964  J. A. MARLAND  3,123,193
TORQUE CONTROL DEVICE
Filed April 21, 1960  3 Sheets-Sheet 3

Inventor
Joseph A. Marland
By:
Graf, Nierman & Burmeister
Attorneys understand# United States Patent Office 3,123,193
Patented Mar. 3, 1964

3,123,193
TORQUE CONTROL DEVICE
Joseph A. Marland, 210 Blackstone, La Grange, Ill.
Filed Apr. 21, 1960, Ser. No. 23,683
2 Claims. (Cl. 192—18)

This invention relates to an improved torque control device, and more specifically to a torque control device which uses an electromagnetic coupling means to control the rotation of a shaft. The improved construction of the instant device provides for ample lubrication of the means during initial movement as well as during continuous operation without hindering the normal operation of the means or materially affecting the efficiency of the device.

In many applications, torque control devices employ an electromagnetic clutch for controlling shaft rotation. One of the problems with such construction is proper lubrication. A copious quantity of lubricant is generally necessary during the initial movement of the clutch, but it is not desirable to have the clutch immersed in the lubricant during operation because churning occurs, which increases the frictional drag on the clutch and decreases the efficiency of the device. Thus, it is desirable that the lubricant in the torque control device be at a higher level during the period shaft rotation commences than during periods of constant rate drive so that the device is properly lubricated during its entire operation. Since the lubricant may collect dirt or other foreign particles which may find their way into the interior of the torque control device, it is desirable to be able to check the lubricant to determine whether it is contaminated and to remove the foreign matter.

It is also desirable to provide a means for cooling the torque control device in order to dissipate the heat generated within the device. In certain applications, it is necessary to have the torque control clutch provide slippage over extended periods so that a large amount of heat is generated.

It is one of the objects of the hereindisclosed invention to provide a novel torque control device which has an electrically operated clutch.

It is another object of this invention to provide a torque control device with a frictional coupling means and a lubricant reservoir which inherently has a higher oil level during rest than during operation so that greater lubrication is applied to the frictional coupling means at the start of operation than during operation.

It is a further object of the instant invention to provide a torque control device having an improved heat transfer arrangement in the device to cool lubricant in the device.

Other objects and uses of the hereindisclosed torque control device will become readily apparent to those who are skilled in the art upon study of the following specification and the accompanying drawings, in which.

Figure 1:
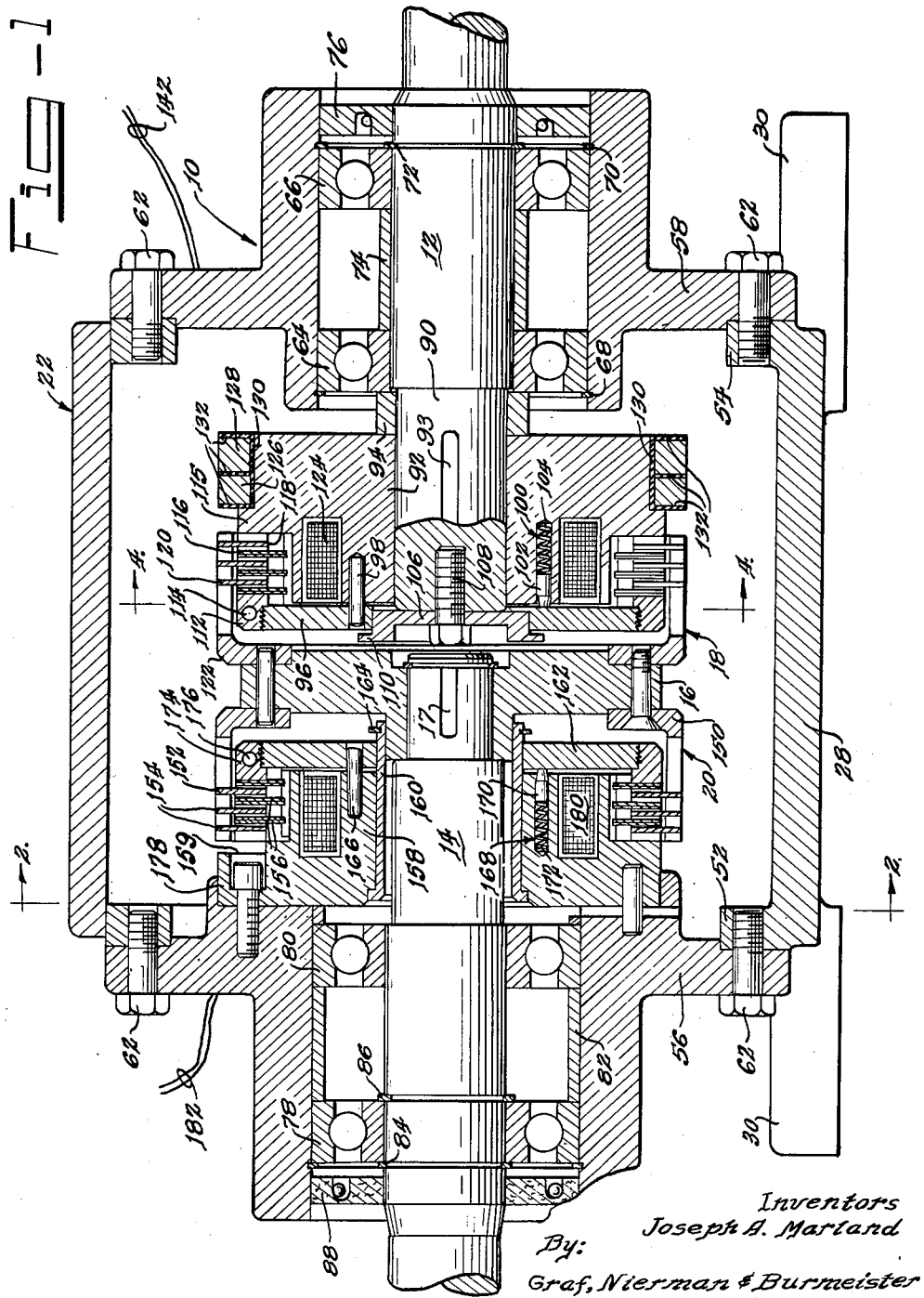
FIGURE 1 is a longitudinal sectional view of a torque control device embodying the present invention.

A torque control device 10 embodying the present invention generally comprises; a horizontal input shaft 12, an output shaft 14 which has its axis of rotation colinear with the axis of rotation of shaft 12, a ring connector 16 keyed to output shaft 14 by a key 17, an electromagnetic clutch 18 mounted on the input shaft 12 and the ring connector 16, a housing 22 journaling the shafts 12 and 14, a brake 20 mounted to the housing and coupled to the ring connector 16, a filter breather 24 mounted on the top of the housing, and a lubricant drain and gauge 26 attached to the housing 22.

The housing 22, which in this instance is cast iron, includes a base 28 which has a plurality of mounting feet 30 formed integral therewith. The base 28 has its upper surface sloping downward to the left as viewed in FIGURE 2 for reasons which will become apparent hereinafter. A pair of reservoir walls 34 and 36 are formed integral with the base. Reservoir wall 34 has a relatively thin lubricant reservoir 38 formed integral therewith, while wall 36 similarly defines a portion of identical reservoir 40. Reservoirs 38 and 40 are defined by a portion of their respective reservoir walls 34 and 36 as in the bottom of the reservoirs in order to provide heat transfer surfaces exposed to the surrounding air. Reservoirs 38 and 40 have inner walls 42 and 44, respectively, which inner walls confront each other. The top of the reservoirs 38 and 40 is open for reasons that will become apparent hereinafter. The inner walls 42 and 44 have restricted control orifices 46 and 48, respectively, opening into the bottom of the respective reservoirs and connecting the bottom of the reservoirs with the lower portion of the housing which is a lubricant sump 50.

The housing has a pair of opposed bearing walls 52 and 54 which are similar in their construction and are formed integral with the reservoir walls and base 28. Output shaft housing 56 and input shaft housing 58 are mounted on the bearing walls 52 and 54, respectively, in a sealed relation to complete the sides of the housing. The top of the housing is closed by a cover plate 60 which is sealed onto the reservoir walls and the bearing walls in order to complete the sealed housing.

Input shaft housing 58 is attached to the bearing wall 54 in a sealed relation by a plurality of screws 62. Housing 58 has a pair of ball bearings 64 and 66 mounted therein. A pair of lock rings 68 and 70 holds the outer race of the respective bearings 64 and 66 in position. The aforementioned input shaft is rotatably mounted in the bearings 64 and 66 and overhangs housing 58 at both ends. A lock ring 72 mounted on the input shaft holds the inner race of bearing 66 in position and a spacer 74 between the inner races of the two bearings holds the inner races apart. An oil seal 76 in housing 58 engages the input shaft to seal the space between the input shaft housing and the input shaft to keep lubricant in housing 22 and foreign matter out.

As was mentioned above, output shaft 14 is rotatably mounted in output shaft housing 56. The shaft is supported within housing 56 by a pair of ball bearings 78 and 80 in much the same manner that the input shaft is supported by ball bearings 64 and 66. Output shaft housing 56 has a spacer 82 positioned between the outer race of each of the ball bearings 78 and 80. A pair of split lock collars 84 and 86 mounted on shaft 14 engaging opposite sides of the inner race of bearing 78 holds the bearing in place to complete a means for locking bearings 78 and 80 in position. An oil seal 88 in the space between the output shaft housing and the end of shaft 14 prevents lubricant from leaking out of housing 22 and foreign material from entering the housing. Seal 88 completes the housing sealing means which makes the device a completely sealed unit that may be used in a variety of atmospheres.

Clutch 18 is mounted on a reduced portion 90 of input shaft 12. The clutch includes an annular clutch magnet body 92 keyed to portion 90. A cylindrical spacer 94 between body 92 and the inner race of bearing 64 serves to hold the bearing in position and holds the body in one plane. An annular clutch armature plate 96 is positioned adjacent to the magnet body 92 and is connected to the body by a plurality of clutch drive pins 98 which allow lateral movement between the magnet body and the armature plate, but restrain all relative rotational movement between the two members. A clutch plate return means 100, which consists of a plunger 102 movably mounted in body 92 engaging plate 96 and a compression spring 104, constantly urges the armature plate away from the magnet body. The armature plate 96 is slidably mounted on a concentric clutch bushing 106 which is secured to the end of shaft 12 by means of a machine screw 108. Clutch bushing 106 has an integral collar 110 which holds the armature plate 96 on the bushing 106. The clutch armature plate 96 has a clutch plate lock nut 112 adjustably threadedly mounted on its outer periphery, which nut is held in position by a clamping screw 114. The lock nut 112 has an outside diameter substantially equal to the outside diameter of body 92, while the outside diameter of the armature plate 96 is slightly less than the outside diameter of the magnet body's integral flange 115.

A plurality of clutch inner disks 116 are splined to magnet body 92. The disks, which have an inside diameter substantially equal to the same diameter of lock nut 112, are axially movable on body 92. A plurality of clutch outer disks 118 is rotatably mounted on the magnet body. Each of the clutch outer disks has a plurality of integral disk tangs 120, which disk tangs are slidably positioned in a clutch spider 122 so that the disks may move in an axial direction relative to the spider but are held in a rotational direction. The spider is in turn fixed to the aforementioned ring connector 16 in a conventional means by a plurality of pins and machine screws. It may be seen that, as armature plate 96 moves closer to magnet body 92, the inner and outer disks are squeezed together between the lock nut 112 and flange 115 so that there is a frictional drive between the magnet body 92 and the ring connector 16.

In order to provide a means for moving the armature plate toward the magnet body, an annular clutch magnetic coil 124 is mounted in a coil groove in the magnet body 92. The magnetic coil 124 is connected to a pair of slip rings 126 and 128 which are mounted on flange 115. The slip rings 126 and 128 are insulated from the magnet body 92 by an insulating ring 130 and a plurality of insulating disks 132 which also insulate the rings from each other. A brush holder 134 positions an electrical contact brush in sliding contact with the slip ring 126, and the brush holder 134 is mounted on housing 22 by a mount 136. A second brush holder 138 positions a second electrical contact brush in sliding contact with slip ring 128 and is mounted on the housing by a second mount 140. Both of the brush holders are connected to a control device, such as a power source and switch (not shown), through wires 142, so that coil 124 may be excited from a remote position.

Brake 20, which is mounted on ring connector 16 and housing 22 as mentioned above, includes a brake spider 150 which is secured to ring connector 16 in the same manner that clutch spider 122 is secured to the connector. Spider 150 slidingly receives a plurality of brake outer disks 152. Each of the brake outer disks has a plurality of disk tangs 154 which engage the spider to prevent any relative rotational movement between the outer disk and the spider. A plurality of brake inner disks 156 is regularly intercalated with the brake outer disks so that the brake inner and outer disks alternate. The brake inner disks are free to rotate relative to spider 150; however, they are splined to an annular brake magnet body 158 which is similar in construction to the clutch magnet body 92. The brake magnet body 158 has an internal flange 159 which is secured to shaft housing 56 by a plurality of conventional screws and pins. The brake magnet body 158 receives a brake bushing 160 in its center, and the brake bushing has an annular brake armature plate 162 slidingly mounted thereon. A lock ring 164, which is mounted in a groove in the brake bushing, holds the armature plate in one plane. A plurality of pins 166 fixed in magnet body 158 slidingly engage the armature plate 162 to prevent rotation of the armature plate relative to the magnet body.

A brake plate return means 168 constantly urges the armature plate toward the ring 164 and away from the magnet body. The return means includes a plunger 170 which engages the armature plate 162 and a coil spring 172 which provides the necessary force to translate the armature plate. A lock nut 174 is threadedly mounted on the outer periphery of the armature plate 162, and a clamping screw 176 holds the nut relative to the plate 162. A brake magnet coil 180 is mounted in an annular aperture in magnet body 158. The coil is electrically connected to a pair of wires 182 which pass through the housing in a conventional manner. The wires 182 connect the brake coil with a suitable power source and control switch which are not shown. The brake coil 180 is selectively electrically energized to pull the armature plate 162 toward the magnet body 158 against the force of the brake plate return means 168. When the brake armature plate 162 is moved toward the brake magnet body 158, the brake inner and outer disks 156 and 152 are pressed together between lock nut 174 and flange 159 so that they are placed in driving frictional engagement.

As was mentioned above, the lower portion of housing 22 contains a lubricant sump 50 which has its lower surface 32 inclined downwardly toward wall 34. In the lower portion of wall 34 and midway between bearing walls 52 and 54, there is a drain aperture 190 which provides a communicating orifice between the lubricant sump and drain and gauge 26. The drain and gauge includes a pipe 192 which is threadedly mounted in wall 34 within the aperture 190. A T coupler 194 is fixed to the other end of the pipe 192 which coupler has a transparent riser or viewing tube 196 vertically fixed therein. The viewing tube 196 has a breather 198 on its upper end to allow a liquid to rise within the tube. The other opening in T coupler 194 has a petcock 200 connected to it so that the lubricant may be drained from the sump 50.

For the sake of illustration, a specific description of the operation of the instant torque control device is given herein; however, it is understood that the instant device may be used in any number of ways in addition to the description given hereinafter. The input shaft is connected to a suitable source of rotating energy which is not shown, and the output shaft is connected to a load which is to be driven. The lubricant sump is filled to an appropriate level with a suitable liquid lubricant so that the lower portions of the brake 20 and the clutch 18 are immersed in the lubricant. The input shaft is rotated to rotate the magnet body 92, so that inner disks 116 rotate relative to outer disks 118. The slip rings 126 and 128 also rotate; however, they are in sliding engagement with their respective brush holders 134 and 138 which provide the connection to the source of electrical energy. The rotation of the magnet body 92 also carries with it the armature plate 96. When it is desired to drive the output shaft 14, coil 124 is energized to pull the clutch armature plate toward the clutch magnet body against the force of the clutch plate return means 100 so that the inner and outer disks 116 and 118 are placed in tight frictional engagement. Thus, the spider 122 is put into rotational motion which in turn drives ring connector 16 to drive the output shaft.

When rotation of the output shaft is no longer required, the current to coil 124 is shut off so that the clutch plate return means 100 pushes armature plate 96 away from the magnet body, thereby allowing the disks 116 and 118 to rotate relative to each other. In many instances the output shaft 14 and load may continue rotating, and it may be desirable to stop the output shaft 14. Coil 180 is then energized to pull armature plate 162 toward magnet body 158 so that the disks 152 and 156 are placed into tight frictional engagement between lock nut 174 and flange 159. Spider 150 is prevented from any rotary motion relative to the housing 22, and in this manner ring connector 16 and output shaft 14 are held from further rotation. Thus, the driven member is braked by the torque control device.

It may be appreciated that the instant device may provide a means for precise controlled movement of output shaft 14 by the cooperation of the brake and the clutch. It has been found that a device of this type may be used as a rapid cycling unit in which the cycling is as fast as 50 cycles per second with precision movement of the output shaft.

Figure 2:
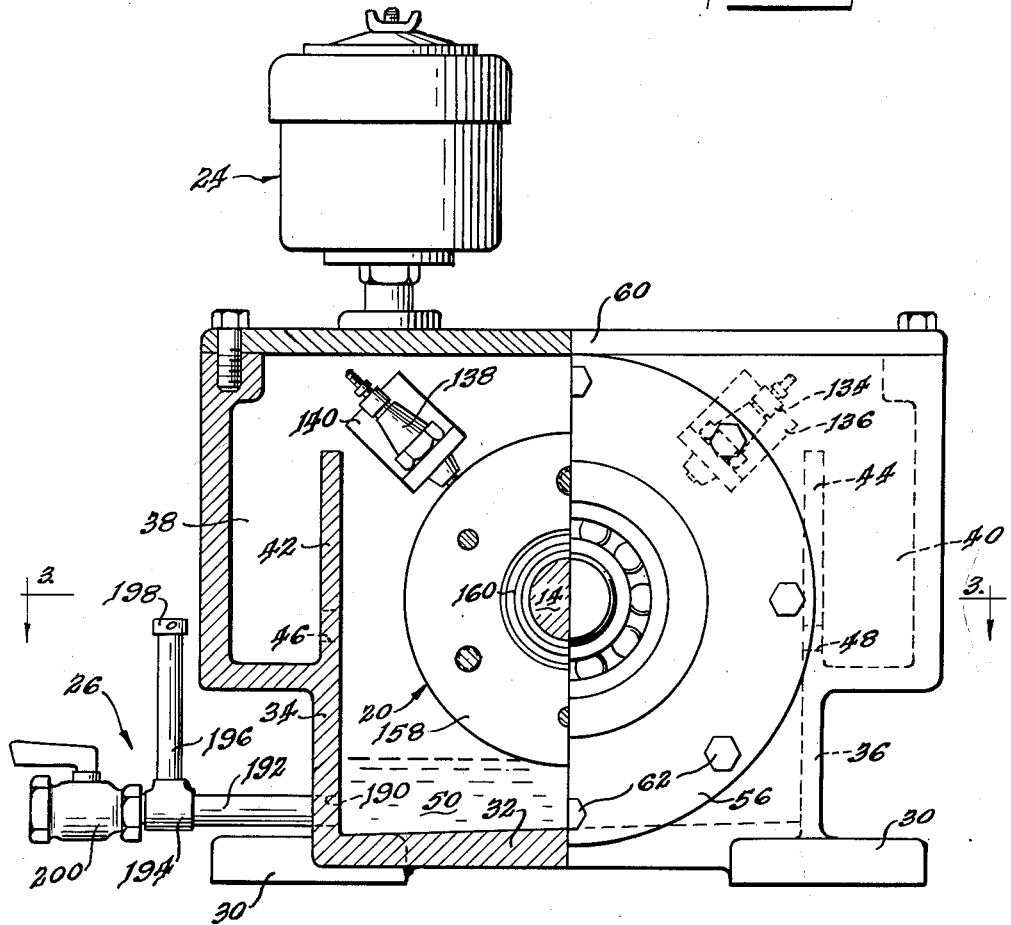
FIGURE 2 is an end view of the torque control device shown in FIGURE 1 with a portion in cross section along the line 2—2 of FIGURE 1.
Figure 3:
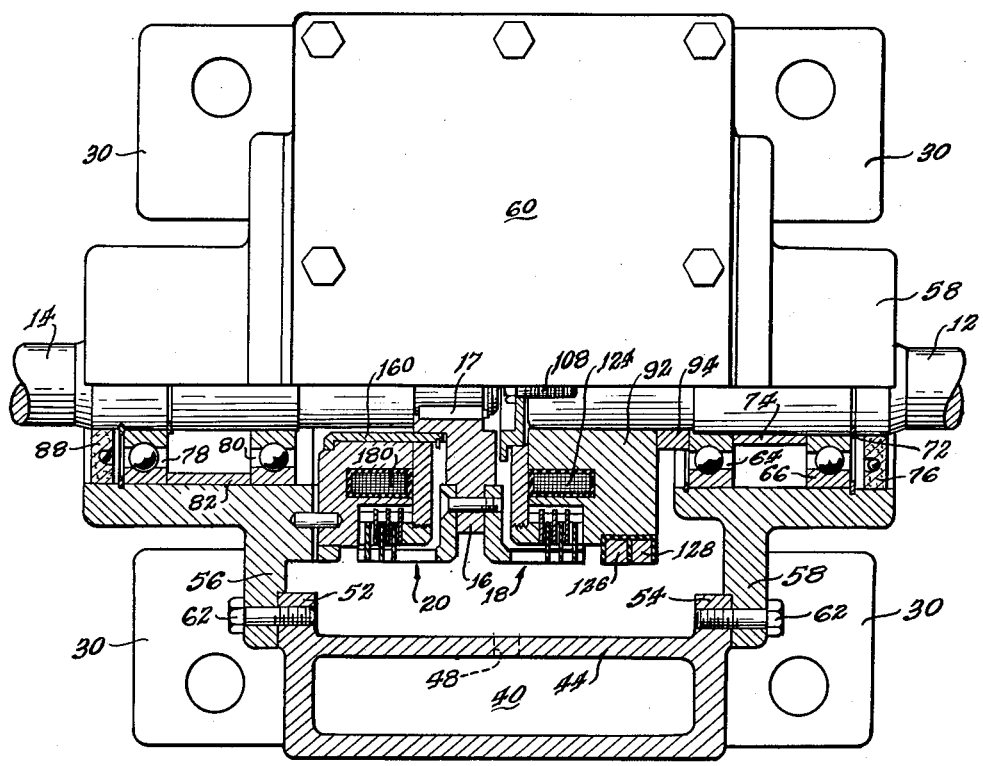
FIGURE 3 is a sectional view of the device taken along the line 3—3 of FIGURE 2.
Figure 4:
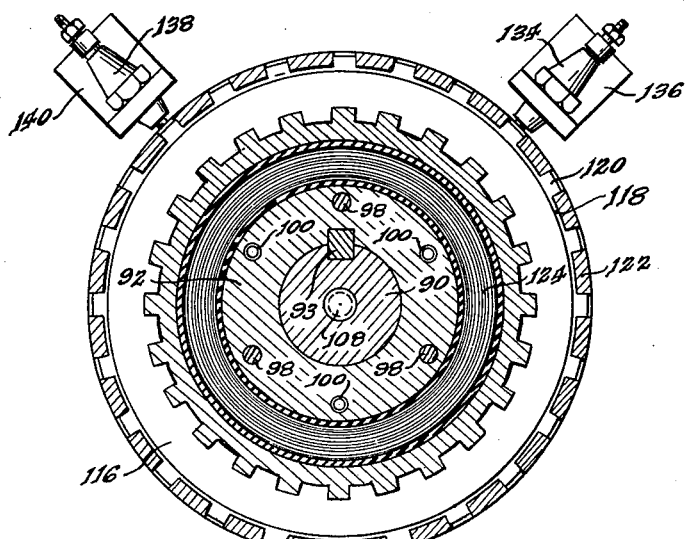
FIGURE 4 is a sectional view taken on line 4—4 of FIGURE 1 showing a detailed construction of the clutch disks.

As portions of the clutch and brake rotate, the rotating members throw lubricant from the sump into the reservoirs 38 and 40 to cool the lubricant and lower the lubricant level in the sump so that the lubricant does not cause a substantial drag on the rotating members. As was pointed out above, the reservoirs 38 and 40 have restricted orifices 46 and 48 which control the flow out of the reservoir at a selected rate. A portion of the lubricant is trapped in the reservoirs although a controlled amount is returned to the sump 50. Since the lubricant can only the vaporized and thrown into the reservoirs when the rotating parts are submerged, the level of the lubricant cannot fall below the rotating members and proper lubrication is assured. The distance above the level at which the rotating members are just immersed under operating conditions depends on the size of the apertures 46 and 48, the larger the apertures the higher the level of lubricant. FIGURE 2 illustrates the lubricant level during operation. The lubricant in the reservoirs is cooled also since it is in contact with an outside wall of the housing. It may also be noted that increases in the vapor pressure within the housing as a result of elevated temperatures are relieved through the filter breather 24. However, when the unit is inoperative and the vapor pressure decreases, the breather 24 allows air to enter the housing so that the seals in the housing are not disturbed and no foreign matter enters the housing.

It may be appreciated that when the input shaft is not rotating and the reservoirs have drained, the lubricant level in the sump may be observed by an operator by inspecting the level in the transparent riser 196 discussed above to determine whether additional lubricant is required. The lubricant may be checked for impurities by withdrawing a portion through petcock 200.

Inasmuch as the device is completely enclosed and sealed, except for the two breathers which act as traps to keep out impurities, the instant device may be used in practically any type of atmosphere, including a very dusty atmosphere such as in a flour mill or cement mill, without damaging the members in the interior of the device.

Although a specific device has been described with a specific operation, it is to be understood that those skilled in the art may find other means of operating the herein-disclosed device and modifications and changes in the disclosed device may be made without departing from the spirit and scope of the present invention. It is therefore intended that the invention set forth herein be limited only by the appended claims.

What is claimed is:

1. A torque control device comprising, in combination: a shaft; an electromagnetic clutch having a generally cylindrical exterior surface coaxially mounted on said shaft, said clutch including a clutch magnet body mounted on said shaft, a clutch coil mounted in said magnet body, a clutch armature plate disposed adjacent to said clutch coil and mounted axially movable relative to said shaft, a plurality of clutch inner disks splined to said magnet body, a plurality of clutch outer disks alternately positioned relative to the clutch inner disks and rotatable relative to said magnet body, said clutch outer disks extending to the cylindrical surface of the clutch, a clutch lock nut mounted on said armature plate and cooperative with said inner clutch disks to decrease the space between said inner clutch disks for placing the inner clutch disks in a driving relation relative to the adjacent outer clutch disks, means constantly urging said clutch armature plate away from the clutch magnet body, and a clutch spider nonrotatably connected to the outer clutch disks; a ring connector drivingly connected to the clutch spider; a second shaft having its axis of rotation colinear with the axis of rotation of the first mentioned shaft connected to said ring connector in a driving relation; an electromagnetic brake having a generally cylindrical surface coaxially connected to said ring connector, said brake including a brake spider drivingly connected to said connector, a plurality of brake outer disks drivingly connected to said spider, said brake outer disks extending to the cylindrical surface of the brake, a plurality of brake inner disks alternately positioned relative to the brake outer disks and rotatable relative to said brake spider, a brake magnet body supporting said brake inner disks in a driving relation therewith, a brake coil mounted in said brake magnet body, a brake armature plate adjacent to said brake coil and axailly movable relative to said second shaft, a brake lock nut mounted on said brake armature plate and cooperative with said brake disks to decrease the space between said disks to place the disks in a driving relation with adjacent disks, and means constantly urging said brake armature plate away from the brake coil; a housing sealingly enclosing said electromagnetic clutch and said electromagnetic brake and supporting the brake magnet body, said housing including a bearing wall having the brake magnet body fixed thereto and rotatably supporting the second mentioned shaft, a second bearing wall opposed to the first bearing wall rotatably supporting the first mentioned shaft, a pair of opposed reservoir walls extending between said bearing walls, each of said reservoir walls having a lubricant reservoir formed integral therewith, each of said reservoirs including a portion of its respective reservoir wall having a heat transfer relationship between the reservoir and the outer portion of the housing, each of said reservoirs being open at its top to receive a lubricant thrown by the brake or clutch and having restricted orifice at its lower portion for controlled returning of lubricant to the lower portion of the housing, a base attached to the bearing walls and the reservoir walls, said base having a sloped surface defining a sloped lower portion of the interior of the housing, and a cover sealingly mounted on the bearing walls and the reservoir walls; and a breather mounted on the cover providing restricted communication between the interior and exterior of the housing.

2. A torque control device comprising, in combination: a shaft; an electromagnetic clutch having a generally cylindrical exterior surface coaxially mounted on the shaft, said clutch including a clutch magnet body mounted on said shaft, a clutch coil mounted in said magnet body, a clutch armature plate adjacent to said clutch coil and mounted axially movable relative to said shaft, a plurality of clutch inner disks splined to said magnet body, a plurality of clutch outer disks alternately positioned relative to the clutch inner disks and rotatable relative to said magnet body, said clutch outer disks extending to the cylindrical surface of the clutch, a clutch lock nut mounted on said armature plate and cooperative with said inner clutch disks to decrease the space between said inner clutch disks for placing the inner clutch disks in a driving relation relative to the adjacent outer clutch disks, means constantly urging said clutch armature plate away from the clutch magnet body, and a clutch spider non-rotatably connected to the outer clutch disks; a ring connector drivingly connected to the clutch spider; a second shaft having its axis of rotation colinear with the axis of rotation of the first mentioned shaft connected to said ring connector in a driving relation; a housing sealingly enclosing said electromagnetic clutch, said housing including a bearing wall rotatably supporting the first shaft and a second bearing wall rotatably supporting the second shaft, a pair of opposed reservoir walls extending between said bearing walls, each of said reservoir walls having a lubricant reservoir formed integral therewith, each of said reservoirs including a portion of its respective reservoir wall having a heat transfer relationship between the reservoir and the outer portion of the housing, each of said reservoirs being open at its top to receive lubricant thrown by the clutch and having a restricted orifice at its lower portion for controlling return of the lubricant to the lower portion of the housing, a base attached to the bearing walls and reservoir walls defining a sump; and a body of liquid lubricant disposed within the sump, said exterior surface of the clutch skimming the body of lubricant when in operation to transfer heat from the clutch inner and outer disks and to spray lubricant.

References Cited in the file of this patent

UNITED STATES PATENTS

| | | |
|---|---|---|
| 964,960 | Everson | July 19, 1910 |
| 1,673,566 | Himes | June 12, 1928 |
| 2,848,085 | Mannaioni | Aug. 19, 1958 |
| 2,884,107 | Frankel | Apr. 28, 1959 |
| 2,956,649 | Kelley | Oct. 18, 1960 |

FOREIGN PATENTS

| | | |
|---|---|---|
| 701,305 | Germany | Jan. 13, 1941 |
| 742,120 | France | Dec. 21, 1923 |

UNITED STATES PATENT OFFICE

CERTIFICATE OF CORRECTION

Patent No. 3,123,193            March 3, 1964

Joseph A. Marland

It is hereby certified that error appears in the above numbered patent requiring correction and that the said Letters Patent should read as corrected below.

Column 2, line 26, for "lubriicant" read -- lubricant --; column 3, line 11, after "108" insert a period; column 5, line 25, for "the", first occurrence, read -- be --.

Signed and sealed this 7th day of July 1964.

(SEAL)
Attest:

ERNEST W. SWIDER
Attesting Officer

EDWARD J. BRENNER
Commissioner of Patents